Aug. 12, 1924.

C. H. DE LA MONTE

RAILWAY MOTOR CAR

Filed Jan. 18, 1922

INVENTOR
Cascious H de La Monte
BY
Reddings Greeley
ATTORNEYS

Aug. 12, 1924.
C. H. DE LA MONTE
1,504,327
RAILWAY MOTOR CAR
Filed Jan. 18, 1922  2 Sheets-Sheet 2
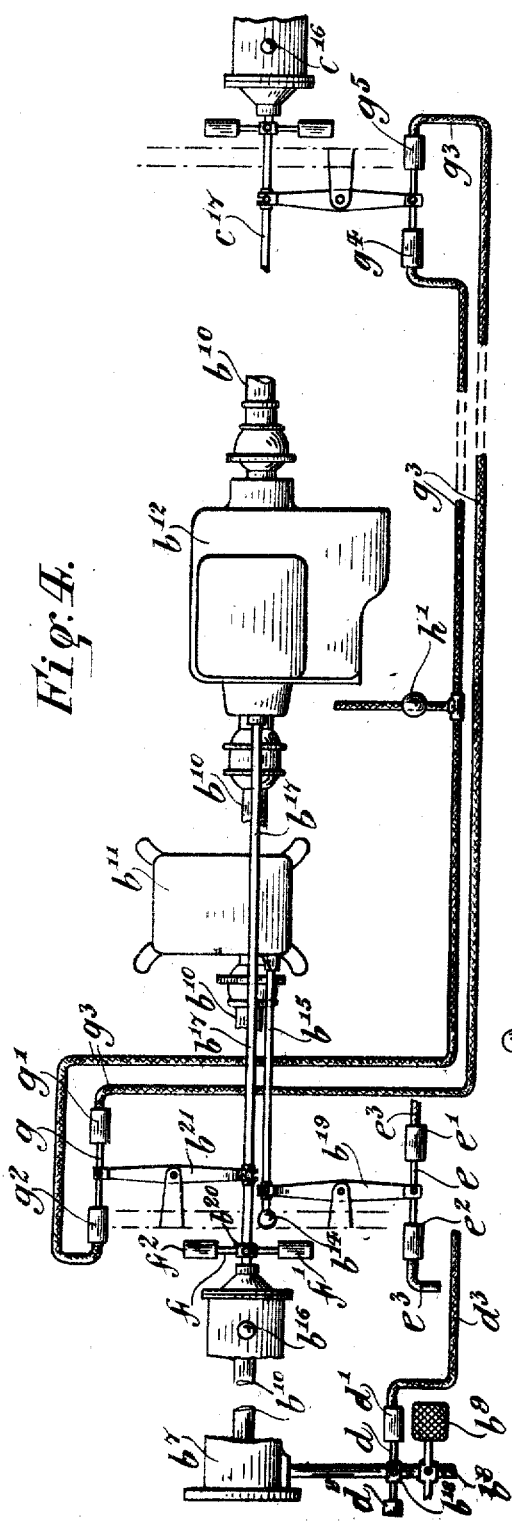
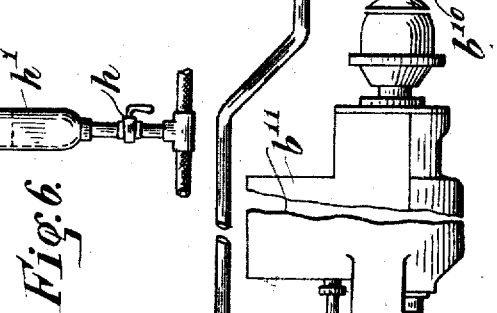
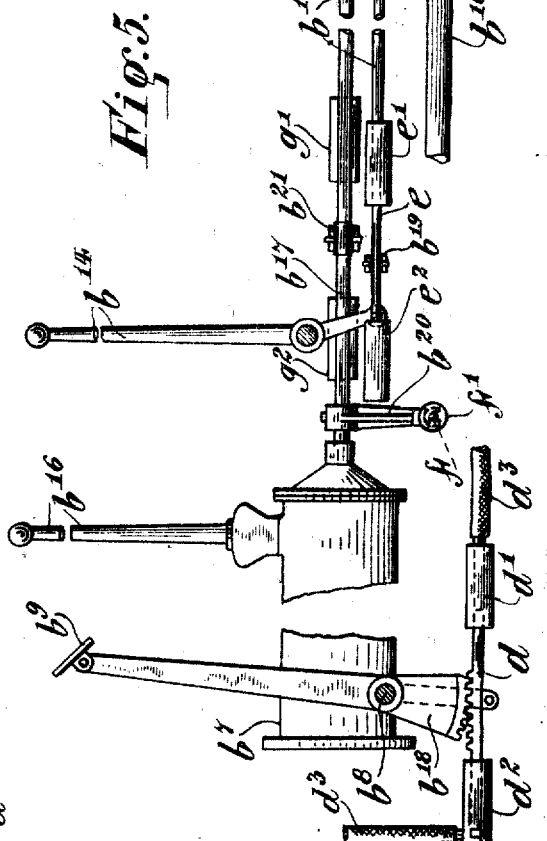

Patented Aug. 12, 1924.

1,504,527

UNITED STATES PATENT OFFICE.

CASCIOUS H. DE LA MONTE, OF NEW YORK, N. Y., ASSIGNOR TO INTERNATIONAL MOTOR COMPANY, OF NEW YORK, N. Y., A CORPORATION OF DELAWARE.

RAILWAY MOTOR CAR.

Application filed January 18, 1922. Serial No. 530,033.

*To all whom it may concern:*

Be it known that I, CASCIOUS H. DE LA MONTE, a citizen of the United States, residing in the borough of Manhattan of the city of New York, in the State of New York, have invented certain new and useful Improvements in Railway Motor Cars, of which the following is a specification, reference being had to the accompanying drawings, forming a part hereof.

This invention relates generally to railway cars propelled by internal combustion engines and has for its general object to provide a car which shall present certain manufacturing and operating advantages. More particularly, the invention seeks to provide an improved motor rail car which may be driven in either direction at variable speeds and controlled by the operator from either end. In meeting such operating requirements it is also proposed to simplify the manufacture of such car by having it conform in all possible respects to accepted automotive practice. Still a further object of the invention is to provide in such a car a plurality of self-contained power units, one or more of which may be operated as desired, and a plurality of control devices for each such unit and its transmission, which control devices may be operated simultaneously from either end of the car or independently. A further object of the invention is to mount the body of such a car for swiveling movement at a plurality of points on the supporting frames, and, in the preferred embodiment, to provide for free swiveling of the bogy trucks at the ends of the car, independent of its swiveling movements.

The broader aspects of the invention will be appreciated more clearly when considered in connection with the more specific objects which are addressed particularly to the embodiment shown in the accompanying drawings. These specific objects are to support the body of a railway car on two motor truck chassis of conventional design which are placed end to end with respect to each other and are supported on flanged wheels for operation on a railroad track. The control elements of the motors of these two chassis and for their transmissions may be interconnected at will, so that the operation of one will effect simultaneously the corresponding operation of the other. In this way it becomes possible for the car to be operated successfully in either direction and by a driver at either end since his movements of the controls of one motor truck chassis will initiate corresponding actuation of the controls of the other motor truck chassis. On the other hand, when desired, one of the power plants and its transmission and its control elements may be cut off so that the propelling power of the car will be derived from one motor truck chassis alone. In the illustrated embodiment it is proposed that the dual control shall be brought about through hydraulic means, but it will be obvious that other control of either a mechanical or electrical character may be employed.

Another feature of the illustrated embodiment consists in the mounting of the body adjacent its ends through king pins on the different truck chassis so that free turning movements between the two chassis and the body are permitted. This flexibility is carried further by mounting the front ends of the respective chassis on bogy trucks which themselves are permitted to swivel with respect to the motor truck chassis. Other objects and advantages of the invention will appear as the description proceeds. Reference is now to be had to the accompanying drawings for an understanding of one embodiment thereof, wherein—

Figure 4 is a detail view on a somewhat larger scale showing the conventional relation of the hydraulic control system to the controlling elements.

Figure 5 is a view in side elevation of the parts shown in Figure 4.

Figure 6 is a view of the overflow cock and stand pipe.

Figure 1:
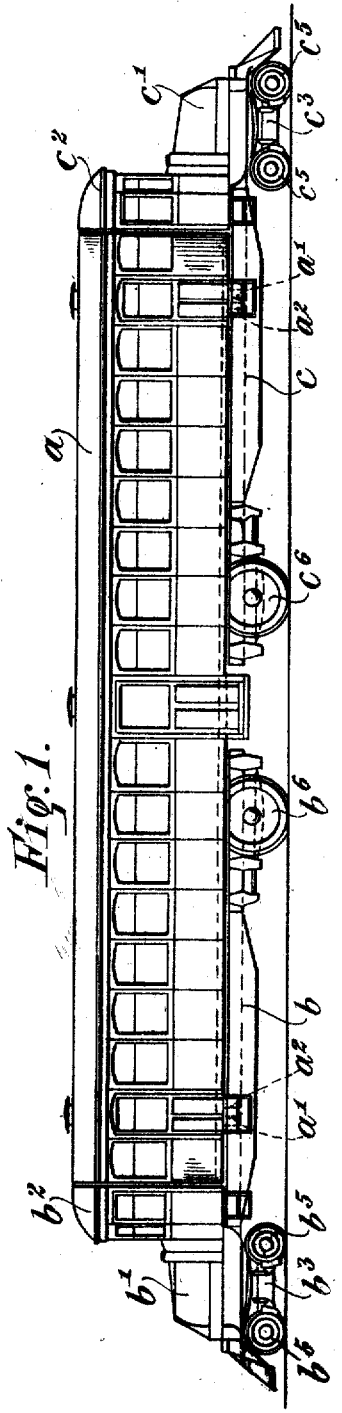
Figure 1 is a view in side elevation of the improved rail car.
Figure 2:
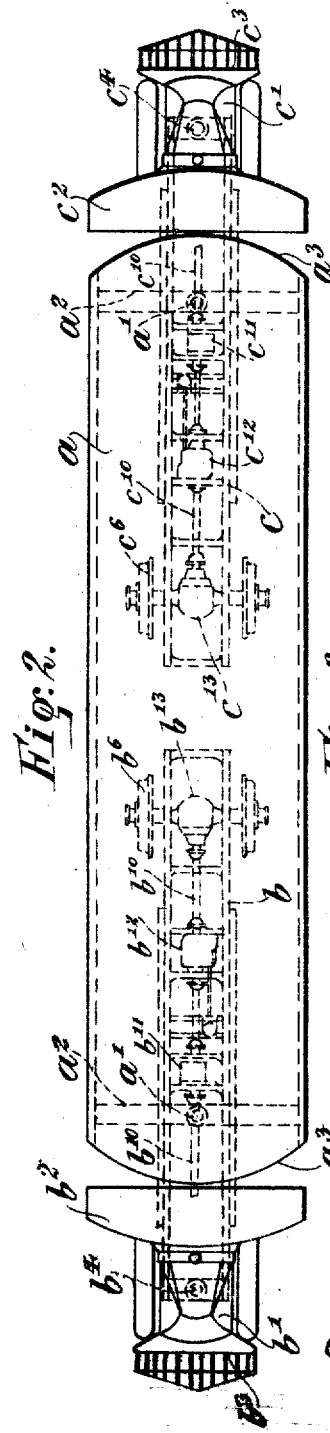
Figure 2 is a view in plan thereof, the conventional parts of the motor truck chassis being indicated in dotted lines.
Figure 3:
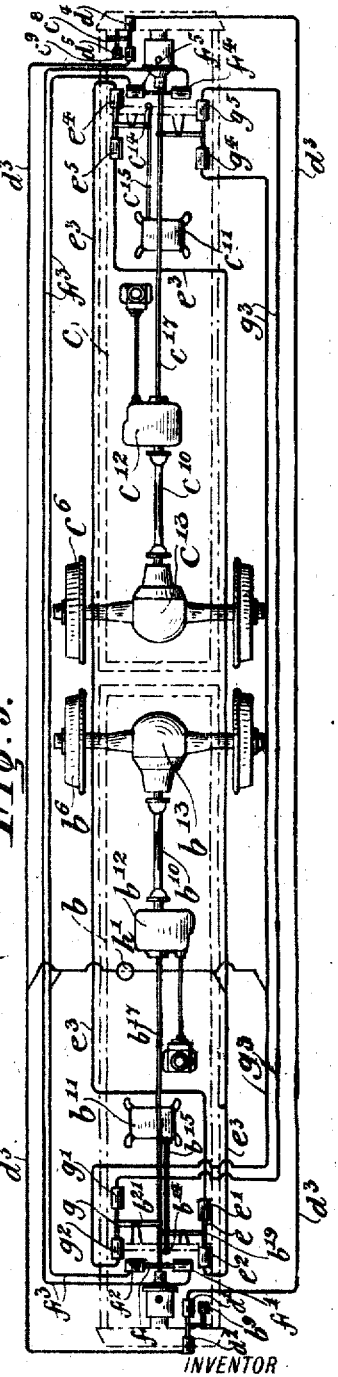
Figure 3 is a plan view of the chassis, the body being removed and showing in diagrammatic form the piping system for interconnecting the controls of the two power units through hydraulic devices which may effectuate simultaneous and corresponding movements of the two controls.

In its broader aspects the invention is not to be limited to any of the details of construction or arrangement or matters of design of the rail car and body illustrated herein. For that reason, most of the parts have been shown somewhat conventionally although with sufficient detail to enable one skilled in the art to understand the principle on which the mode of operation is based. The supporting frame for the car body $a$ is made up of two or more motor truck chassis $b$, $c$, only two such chassis being shown herein and these chassis being disposed end to end so that their power units, indicated as disposed under the bonnets $b'$, $c'$, respectively, will be found at the opposite ends of the car $a$ so that the operator, depending usually upon the direction of travel of the car, may be seated in cabs $b^2$, $c^2$ near the respective power plants $b'$, $c'$ and their respective controls (to be described), as will be desirable. What would normally constitute the front end of the chassis $b$ will preferably be supported on a bogy truck, indicated generally at $b^3$, which is in swiveled connection with the chassis frame $b$ through a king pin $b^4$ and, similarly what would normally be the front end of the chassis $c$ will be supported on a bogy truck $c^3$ through a king pin connection $c^4$. Both of these bogy trucks will be supported on flanged wheels $b^5$ $c^5$, respectively, and the traction wheels $b^6$, $c^6$ of the respective chassis will also be flanged so as to admit of operation of the chassis on rails. The car body $a$, which may be of any desired form for passengers or freight, may be connected for swiveling movement to the two chassis $b$, $c$ through king pins $a'$ so that the chassis may turn freely with respect to the body $a$ and with respect to one another as is desirable in rail car practise. Transverse bolsters, indicated conventionally at $a^2$, may be carried on the respective chassis $b$, $c$ and afford lateral support for the car body. The opposite ends of the car $a$ may be curved, as indicated at $a^3$, or otherwise cut away, to afford clearance between it and the adjacent cabs $b^2$, $c^2$.

The transmission and control elements for the supporting chassis frames $b$, $c$ and their interrelation whereby unitary control and operation are effected will now be described. The invention is not to be limited to the transmission elements so it is understood that those illustrated, being of conventional form, are merely referred to for the sake of completeness and by way of example. Since the conventional transmission elements are duplicated in the two chassis, it will be sufficient to describe briefly only those parts on one of the chassis. In Figures 4 and 5, for instance, most of the transmission elements for the truck chassis $b$ are shown in some detail. The clutch for controlling delivery of power from the power plant $b'$ is indicated conventionally at $b^7$. Its rock shaft $b^8$ may be oscillated in the usual way through a foot pedal $b^9$. The propellor shaft $b^{10}$ may extend into a reverse gear transmission set, indicated conventionally at $b^{11}$ and thence through a change speed gear set, indicated conventionally at $b^{12}$, to the final drive for the traction wheels $b^6$, indicated conventionally at the housing $b^{13}$. It will be understood that the reverse gear set $b^{11}$, when the chassis is traveling in a direction which would ordinarily be considered forwards, will not reverse the direction of rotation of the propellor shaft beyond the gear set. On the other hand when the chassis $b$ is to be propelled in a direction which would ordinarily be considered backwards, the gear set $b^{11}$ may be thrown into reverse through a shifter lever $b^{14}$ and shifter rod $b^{15}$. Since the reverse gear set $b^{11}$ is designed to reverse the direction of rotation of the final drive shaft it will be appreciated that the shifting of the selective speed gears in the set $b^{12}$ will effect the same number of speeds when the gear set $b^{11}$ causes reverse travel as when the chassis is being propelled forwards. Control of the selective speed gears in the set $b^{12}$ is effected through a shifter lever $b^{16}$ and shifter rod $b^{17}$. All of the parts thus far described are well known and have heretofore been disposed in similar relationship to that described. All of the parts described with reference to the chassis $b$ and its power plant $b'$ are duplicated with respect to the chassis $c$ and its power plant $c'$ and need not be described in detail except to point out that the final drive gears $c^{13}$ reverses the direction of rotation of the traction wheels $c^6$ from that which would normally be expected, so that with all of the units in corresponding relation on the chassis $b$ and on the chassis $c$, the two chassis will be propelled in the same direction. This condition is accomplished conveniently by reversing the relation of the final drive gears, as heretofore indicated. Other ways of accomplishing this may, of course, be practised.

If now the car $a$ were to be propelled by only one of the power plants $b'$, $c'$, usually depending upon the direction of travel of the car, it would be clear that the operator might place himself in the forward cab and manipulate the control elements for the forward motor, the motor at the rear end of the car being inactive and its transmission gears in neutral, so that its traction wheels would roll freely. When the direction of travel was to be reversed the operator might go into the other cab and reverse all of the conditions of operation. However, it is one of the important objects of the invention to provide for a dual control of the two power plants $b'$, $c'$ whereby they may be employed simultaneously in propelling the car and simultaneous and corresponding actuation of their control devices may be effected by an operator at either end of the car. To this end, it is proposed to interconnect operatively the two clutches, the gear sets and, if desired, the spark and throttle controls. This might be done in many ways but the illustrated embodiment shows hydraulic devices which are thought to be simple, compact and practicable. The clutch pedal $b^9$ actuates the rock shaft $b^8$ for throwing the clutch and this rock shaft carries a depending segmental rack $b^{18}$ which engages a reciprocable plunger $d$, the opposite ends of which extend into hydraulic cylinders $d'$, $d^2$, respectively. These cylinders are connected through a piping $d^3$ with similar hydraulic cylinders $d^4$, $d^5$ on the chassis $c$. Its clutch shaft $c^8$ is connected operatively in the same way to the hydraulic cylinders $d^4$, $d^5$. The effect of this construction is that when the piping $d^3$ and the cylinders $d'$, $d^2$, $d^4$, $d^5$ are filled with a liquid, actuation of either one of the clutch pedals $b^9$, $c^9$, will communicate corresponding movement to the other pedal, thereby effecting simultaneous and similar actuation of the clutches. The shifter rod $b^{16}$ for the reverse gear set $b^{11}$ has connected thereto a lever $b^{19}$, the free end of which is connected to a plunger $e$, the opposite ends of which extend into opposed hydraulic cylinders $e'$, $e^2$. These cylinders are, in turn, connected through piping $e^3$ to hydraulic cylinders $e^4$, $e^5$ on the chassis $c$. These cylinders are operatively connected in similar manner to the reverse gear shifter rod $c^{15}$. When the shifter lever $b^{14}$ is actuated to shift the reverse gear set $b^{11}$ its movement is communicated through the hydraulic devices described to the reverse gear shifter lever $c^{14}$ and the reverse gear set $c^{11}$ is thereupon simultaneously thrown into corresponding condition.

The shifter rod $b^{17}$ has a depending arm $b^{20}$ which moves angularly when the shifter arm $b^{17}$ is rocked by the shifter lever $b^{16}$. The lower end of the arm $b^{20}$ is connected to a plunger rod $f$, disposed transversely of the chassis $b$, and the opposite ends of this rod extend into opposed hydraulic cylinders $f'$, $f^2$. These cylinders $f'$, $f^2$ are connected through piping $f^3$ to similar cylinders $f^4$, $f^5$, which are connected through similar devices to the shifter rod $c^{17}$ and give to it a corresponding angular position to that which the shifter rod $b^{17}$ assumes.

The shifter rod $b^{17}$ has pivoted thereto a swinging lever arm $b^{21}$, which is generally similar to the arm $b^{19}$, and is connected at its free end to a plunger $g$ which has its opposite ends extending into opposed hydraulic cylinders $g'$, $g^2$. These cylinders are connected through piping $g^3$ to similar cylinders $g^4$, $g^5$ on the chassis $c$ which are operatively connected through similar mechanism to the shifter rod $c^{17}$. Longitudinal movement of the shifter rod $b^{17}$ by means of the shifter lever $b^{16}$ will be communicated simultaneously and correspondingly to the shifter rod $c^{17}$.

All of the operations necessary for a conventional control on a motor truck chassis have now been described and the interconnection of such devices on two truck chassis will give the simultaneous control desired for operation of the car by a plurality of power plants placed under the control of an operator at either end of the car. In the description, reference characters having similar exponents have been employed on the truck chassis $c$ and on the truck chassis $b$. Where it is desired to propel the car by a single power plant the effective hydraulic action may be cut out of the various lines $d^3$, $e^3$, $f^3$, $g^3$, by relieving the pressure therein through an overflow cock $h$ in a common stand-pipe $h'$ connected with said lines. Where the pressure is thus relieved, it is evident that movement of the plungers in the various paths of the cylinders will cause displacement of the liquid in the stand-pipe without transmitting power to the other plungers in the same line. With the gears in neutral, therefore, one truck chassis may roll along freely under the propulsion of the other.

Changes in matters of design and means may be made without departing from the spirit of the invention provided the desired results are secured by devices which function on the same principles as those set forth herein.

I claim as my invention:

1. A rail motor car composed of two motor-truck chassis each having swiveling bogy trucks and separate drive wheels set end to end and each having its own conventional power plant, clutch and change-speed transmission thereon, a car body mounted on said chassis in swiveling engagement therewith and disposed between said power plants, and double-end controls for said power plants, clutches and change-speed transmissions mounted on the respective chassis but disposed adjacent to opposite ends of said car body and operatively interconnected, whereby simultaneous and corresponding control of said power plants, clutches, and change-speed gears may be effected by a single operator at either end of the car body.

2. A rail motor car composed of two motor truck chassis mounted on flanged wheels and each having its own power plant and transmission, a car body mounted on said chassis, and hydraulic means operatively interconnecting the control elements for said transmissions, whereby simultaneous and corresponding conditions in said controls may be secured.

3. A rail motor car composed of two motor truck chassis mounted on flanged wheels and each having its own power plant and transmission, a car body mounted on said chassis, hydraulic means operatively interconnecting the control elements for said transmissions, whereby simultaneous and corresponding conditions in said controls may be secured, and means to relieve the hydraulic pressure in the system.

4. In a rail motor car, traction wheels therefor, a plurality of internal combustion engines connected operatively with said traction wheels, independent transmissions for said internal combustion engines including actuating parts, plungers connected operatively with said actuating parts, hydraulic cylinders into which said plungers extend, and piping between said cylinders, whereby movement of one of said actuating parts causes movement of the corresponding actuating part.

This specification signed this 10th day of January, A. D. 1922.

CASCIOUS H. DE LA MONTE.